US008605998B2

(12) United States Patent
Samples et al.

(10) Patent No.: US 8,605,998 B2
(45) Date of Patent: Dec. 10, 2013

(54) REAL-TIME 3D POINT CLOUD OBSTACLE DISCRIMINATOR APPARATUS AND ASSOCIATED METHODOLOGY FOR TRAINING A CLASSIFIER VIA BOOTSTRAPPING

(75) Inventors: Michael Edward Samples, Ann Arbor, MI (US); Michael Robert James, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 417 days.

(21) Appl. No.: 13/102,801

(22) Filed: May 6, 2011

(65) Prior Publication Data
US 2012/0281907 A1 Nov. 8, 2012

(51) Int. Cl.
*G06K 9/62* (2006.01)
*G06K 9/00* (2006.01)

(52) U.S. Cl.
USPC .......................................... 382/159; 382/104

(58) Field of Classification Search
None
See application file for complete search history.

(56) References Cited

U.S. PATENT DOCUMENTS

| 5,487,117 | A | 1/1996 | Burges et al. | |
|---|---|---|---|---|
| 6,421,463 | B1 * | 7/2002 | Poggio et al. | 382/224 |
| 7,263,509 | B2 | 8/2007 | Lee et al. | |
| 7,421,415 | B2 * | 9/2008 | Dong et al. | 706/12 |
| 2008/0025568 | A1 * | 1/2008 | Han et al. | 382/103 |
| 2009/0067730 | A1 | 3/2009 | Schneiderman | |
| 2009/0192955 | A1 | 7/2009 | Tang et al. | |
| 2009/0210362 | A1 | 8/2009 | Xiao et al. | |
| 2009/0310867 | A1 | 12/2009 | Matei et al. | |

OTHER PUBLICATIONS

Self-supervised terrain classification for planetary rovers, by Brooks, et al., MIT, Journal of field robotics vol. 29, issue 3, 2012.*
A study of visual and tactile terrain classification and classifier fusion for planetary exploration rovers, by Halatci, et al., Department of Mechanical Engineering—MIT, Feb. 2007.*
Peters et al., "Acquisition of Topological Action Maps through Teleoperation," Proceedings of the 2004 IEEE International Conference on Robotics & Automation, Apr. 2004, pp. 4565-4570.
Anguelov et al., "Discriminative Learning of Markov Random Fields for Segmentation of 3D Scan Data," Proceedings of the 2005 IEEE Computer Society Conference on Computer Vision and Pattern Recognition (CVPR '05), 2005, pp. 1-8.
Bacha et al., "Odin: Team VictorTango's Entry in the DARPA Urban Challenge," Journal of Field Robotics 25(8), 2008, pp. 467-492.

(Continued)

*Primary Examiner* — Vikkram Bali
(74) *Attorney, Agent, or Firm* — Oblon, Spivak, McClelland, Maier & Neustadt, L.L.P.

(57) ABSTRACT

Training a strong classifier by classifying point cloud data with a first classifier, inferring a first terrain map from the classified point cloud data, reclassifying the point cloud data with the first classifier based on the first terrain map, and training a second classifier based on the point cloud data reclassified with the first classifier based on the terrain map. The point cloud data is then classified with the second classifier, and the procedure followed with the first classifier is iteratively repeated until a strong classifier is determined. A strong classifier is determined when a probability of a terrain map matching a given terrain for the strong classifier is approximately equal to a probability of a terrain map matching the given terrain for a prior trained classifier.

19 Claims, 9 Drawing Sheets

(56) References Cited

OTHER PUBLICATIONS

Bradski et al., Learning Open CV: Computer Vision with the OpenCV Library, Sep. 24, 2008; Table of Contents, 4 pages; Chapter 13, Sections 13.6-13.8.2, 25 pages.

Dahlkamp et al., "Self-supervised Monocular Road Detection in Desert Terrain," Robotics: Science and Systems, 2006, 7 pages.

Diebel et al., "An Application of Markov Random Fields to Range Sensing," Proceedings of Conference on Neural Information Processing Systems (NIPS), 2005, 8 pages.

Frome et al., "Recognizing Objects in Range Data Using Regional Point Descriptors," Proceedings of the European Conference on Computer Vision (ECCV), May 2004, 14 pages.

Hadsell et al., "Accurate Rough Terrain Estimation with Space-Carving Kernels," Proceedings of Robotics: Science and Systems, Jun. 2009, 8 pages.

Johnson, et al., "Using Spin Images for Efficient Object Recognition in Cluttered 3D Scenes," IEEE Transactions on Pattern Analysis and Machine Intelligence, vol. 21, No. 5, May 1999, pp. 433-449.

Lu et al., "A Hybrid Conditional Random Field for Estimating the Underlying Ground Surface from Airborne LiDAR Data," IEEE Transactions on Geoscience and Remote Sensing, vol. 47, Issue 8, Jul. 2009, 11 pages.

Montemerlo et al., "Junior: The Stanford Entry in the Urban Challenge," Journal of Field Robotics, 25(9), 2008, pp. 569-597.

Munoz et al., "Contextual Classification with Functional Max-Margin Markov Networks," IEEE Computer Society Conference on Computer Vision and Pattern Recognition (CVPR), Jun. 2009, 8 pages.

Sithole et al., "Experimental comparison of filter algorithms for bare-Earth extraction from airborne laser scanning point clouds," ISPRS Journal of Photogrammetry and Remote Sensing, 59, 2004, pp. 85-101.

Urmson et al., "Autonomous Driving in Urban Environments: Boss and the Urban Challenge," Journal of Field Robotics 25(8), 2008, pp. 425-466.

Wellington et al., "A Generative Model of Terrain for Autonomous Navigation in Vegetation," The International Journal of Robotics Research, 25(12), 2006, 15 pages.

Winkler, Image Analysis, Random Fields and Dynamic Monte Carlo Methods: A Mathematical Introduction, 2003, pp. 47-61.

Wolf et al., "Autonomous Terrain Mapping and Classification Using Hidden Markov Models," Proceedings of the IEEE International Conference on Robotics and Automation (ICRA), 2005, pp. 2038-2043.

* cited by examiner

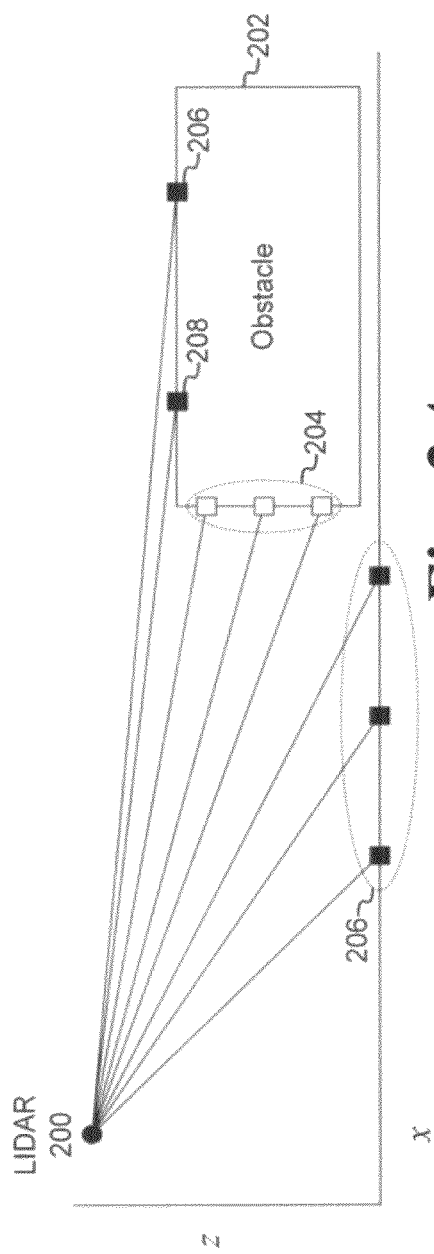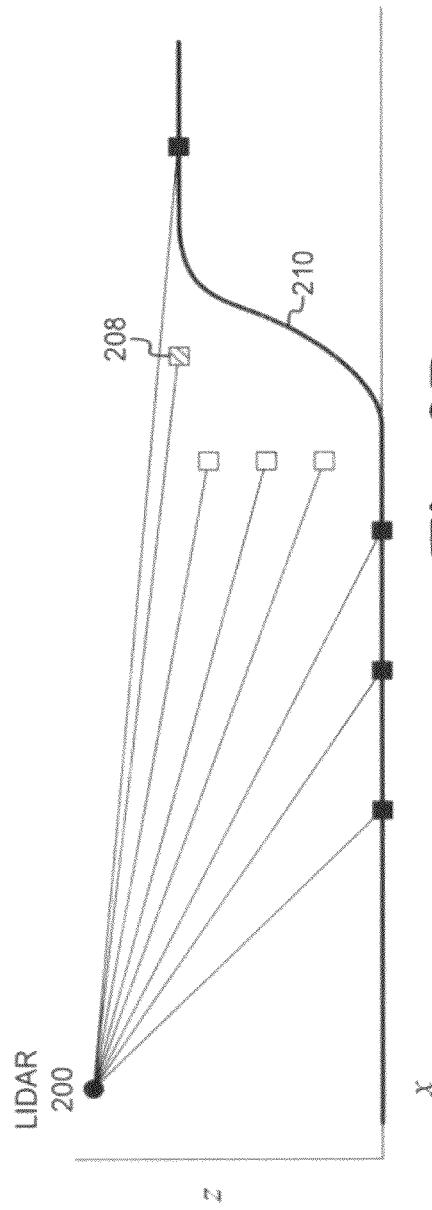

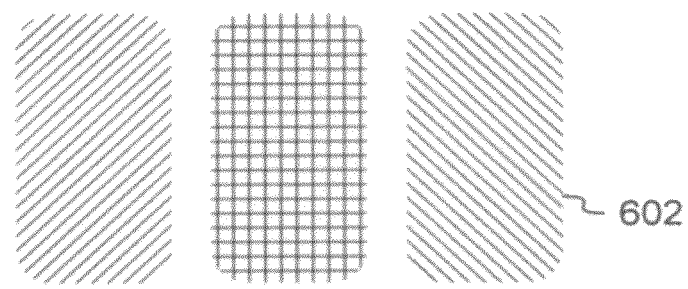
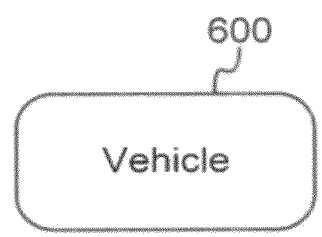
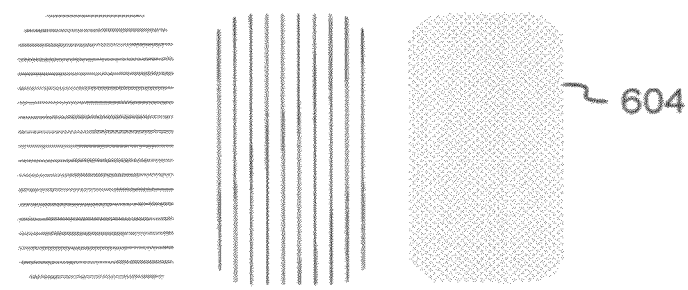
*Fig. 6*

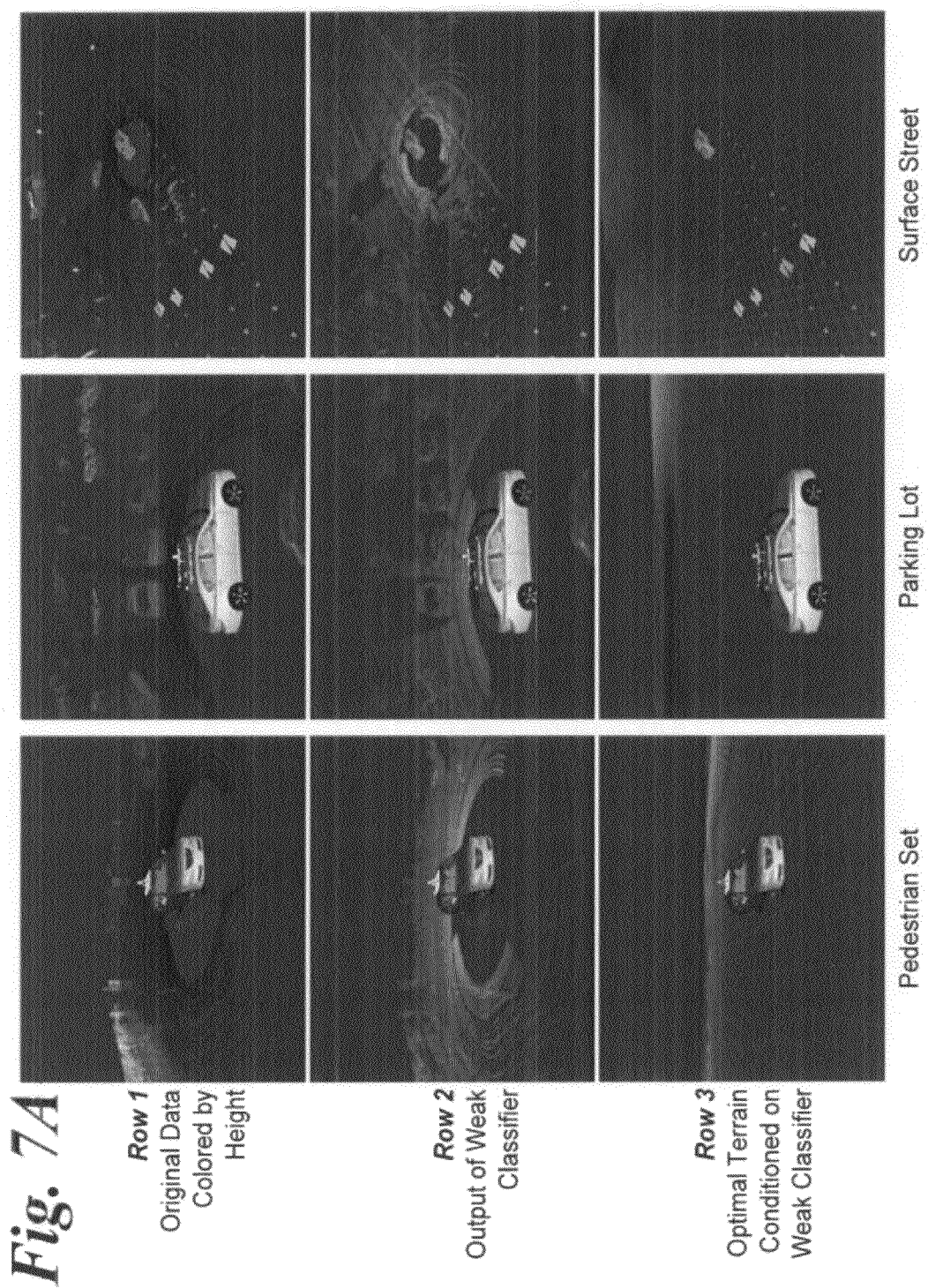

REAL-TIME 3D POINT CLOUD OBSTACLE DISCRIMINATOR APPARATUS AND ASSOCIATED METHODOLOGY FOR TRAINING A CLASSIFIER VIA BOOTSTRAPPING

BACKGROUND

The present application relates to detecting objects from three-dimensional (3D) data. Applications thereof include training a classifier to correct misclassified data points.

The "background" description provided herein is for the purpose of generally presenting the context of this disclosure. Work of the presently named inventors, to the extent it is described in this background section, as well as aspects of the description which may not otherwise qualify as prior art at the time of filing, are neither expressly or impliedly admitted as prior art against the present invention.

Autonomous driving in urban environments requires the ability to quickly identify navigable terrain from potential obstacles. As mobile robots move from structured test environments to real-world scenarios, robotic perception systems must become more competent in navigating through dynamic environments. In addition to determining local navigability, perception systems should also identify the location and class of obstacles within the scene.

Vehicles in the 2007 DARPA Urban Challenge used a combination of LIDAR (light detection and ranging), vision, and radar for obstacle detection. Each of these sensors has its own unique advantages and challenges, but in this disclosure, primary attention is directed to the use of LIDAR sensors to directly acquire 3D point clouds from objects within a scene.

Mobile robotics are naturally dependent on planning paths in metric space; using point clouds greatly simplifies the problem of acquiring relative obstacle pose, but has its own unique challenges in obstacle detection and classification. LIDAR data becomes much sparser away from the sensor, and laser typically lacks high-resolution texture data that can be used for feature generation.

Simple strategies, such as ground point removal by height thresholding, work in simple environments, but are not robust in real-world autonomous driving scenes. Moreover, simple systems are difficult to tune correctly. A classifier with a high false-positive rate may cause an autonomous vehicle to take sub-optimal paths, or produce uncomfortable stop-and-go behavior.

The problem of obstacle detection and classification from 3D point clouds can be approached using local feature-based classifiers solved as a joint inference labeling problem or a combination of both. Several approaches have also tried to directly train classifiers to recognize specific objects in a scene. In general, the techniques which use global labeling by the joint distribution of features and labels outperform the local classifier techniques. However, this improvement in classifier performance comes at greatly increased computational cost.

Autonomous driving systems require both high accuracy and rapid classification to perform at modest street-driving velocities. During the 2007 DARPA Urban Challenge, vehicles with uncertain obstacle maps were able to slow down and take more sensor measurements. This option may not always be available.

Dahlkamp et al. in "Self-supervised Monocular Road Detection in Desert Terrain," Robotics: Science and Systems II, The MIT Press, 2007, demonstrate the bootstrapping of a vision-based classifier in cases where the features indicative of obstacles may change over time. Similarly, due to the wide variety of autonomous driving situations, it is challenging to generate a large human-labeled 3D point cloud for use as a training data in a machine learning algorithm.

Many recent mobile robotics applications have incorporated the use of 3D LIDAR sensors as an important component in scene understanding due to frequent data measurements and direct observation of geometric relationships. However, the sparseness of point cloud information and the lack of unique cues at an individual point level presents challenges in algorithm design for obstacle detection, segmentation, and tracking.

Since individual measurements yield less information about the presence of obstacles, many algorithmic approaches model the joint posterior of point-labels. Such approaches can produce robust point labelings at higher computation cost.

SUMMARY

Aspects of this application relate to approaches to terrain estimation, including one approach using a random field model. Results are presented which compare the accuracy and speed of learned classifiers, and an efficient solution to obstacle detection problem is discussed for scene segmentation.

One embodiment is directed to a controller for training a classifier configured to classify/label data points of point cloud data as an obstacle or a non-obstacle. The controller includes a processor configured to classify point cloud data with a first classifier, infer a first terrain map from the classified point cloud data, reclassify the point cloud data with the first classifier based on the first terrain map, and train a second classifier based on the point cloud data reclassified with the first classifier based on the terrain map. In one aspect, the first classifier is manually constructed and the second classifier is constructed by the training performed by the processor.

In a further aspect, the processor is further configured to compare a first classification result of the first classifier with a second classification result of the second classifier, determine whether the first result is sufficiently close to the second result, and in response to determining the first and second results are not sufficiently close, classify the point cloud data with the second classifier and infer a second terrain map from the point cloud data classified by the second classifier. The controller may iteratively train classifiers until a classification result of an Nth classifier is sufficiently close to a classification result of an (Nth−1) classifier, and utilize the Nth classier to classify newly received point cloud data.

The processor may be configured to infer terrain maps using a conditional random field (CRF) model. The processor may determine probabilities of inferred terrain maps matching a given terrain, wherein the processor compares the classification results based on the determined probabilities. The processor may also determine the classification results are not sufficiently close when the associated probabilities are not approximately equal. Alternatively, the processor may determine the classification results are not sufficiently close when the associated probabilities are not within a predetermine range of each other. Also, the CRF model may be configured to smooth terrain and match labeled data.

In another aspect, the controller includes a first network interface controller configured to establish a communication link between the processor and a sensor which acquires the point cloud data. The first network controller is configured to receive the point cloud data from the sensor. The sensor may be a component of the controller, and may include a light detection and ranging (LIDAR) scanning device and a second network controller configured to communicate with the first network controller.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A is a graph illustrating a two-dimensional example of misclassifying a LIDAR measurement;

FIG. 2B is a graph illustrating a correction of the misclassified LIDAR measurement in FIG. 2A;

FIG. 6 is a block model showing segmentation of obstacle points in a scene;

FIGS. 7A-7B are pictures illustrating comparative classification results from three test sets: Pedestrian Set, Parking Lot, and Surface Street.

DETAILED DESCRIPTION OF THE EMBODIMENTS

In embodiments of this application, joint posterior approaches are utilized with smooth terrain priors for point cloud obstacle discrimination. The resulting labels are used to bootstrap efficient disciminators which require no human labeled data, yet are comparable in discriminative ability to the joint posterior approaches.

Described herein is a technique to automatically acquire and label large 3D point clouds for use in a feature-based classification algorithm executed by a processor of a controller of a vehicle. In one aspect, the technique solves a terrain estimation problem to generate large labeled data sets of features for point cloud classification.

The resulting classifier approximates the accurate classification output of the joint labeling problem, but achieves this with only small computational cost. This approach uses no human-labeled data, and can be run iteratively to increase the classification accuracy.

Any processes, descriptions or blocks in flow charts described herein should be understood as representing modules, segments or portions of code which include one or more executable instructions for implementing specific logical functions or steps in the processes/algorithms, and alternate implementations are included within the scope of the exemplary embodiments in which functions may be executed out of order from that shown or discussed, including substantially concurrently or in reverse order, depending upon the functionality involved, as would be understood by those skilled in the art.

Moreover, as will be recognized by a person skilled in the art with access to the teachings of this disclosure, several combinations and modifications of the presented embodiments can be envisaged without leaving the scope of this disclosure as encompassed by the appended claims. Thus, numerous modifications and variations of the claims are possible in light of the above teachings, and it is therefore to be understood that within the scope of the appended claims, embodiments may be practiced otherwise than as specifically described herein.

Figure 1:
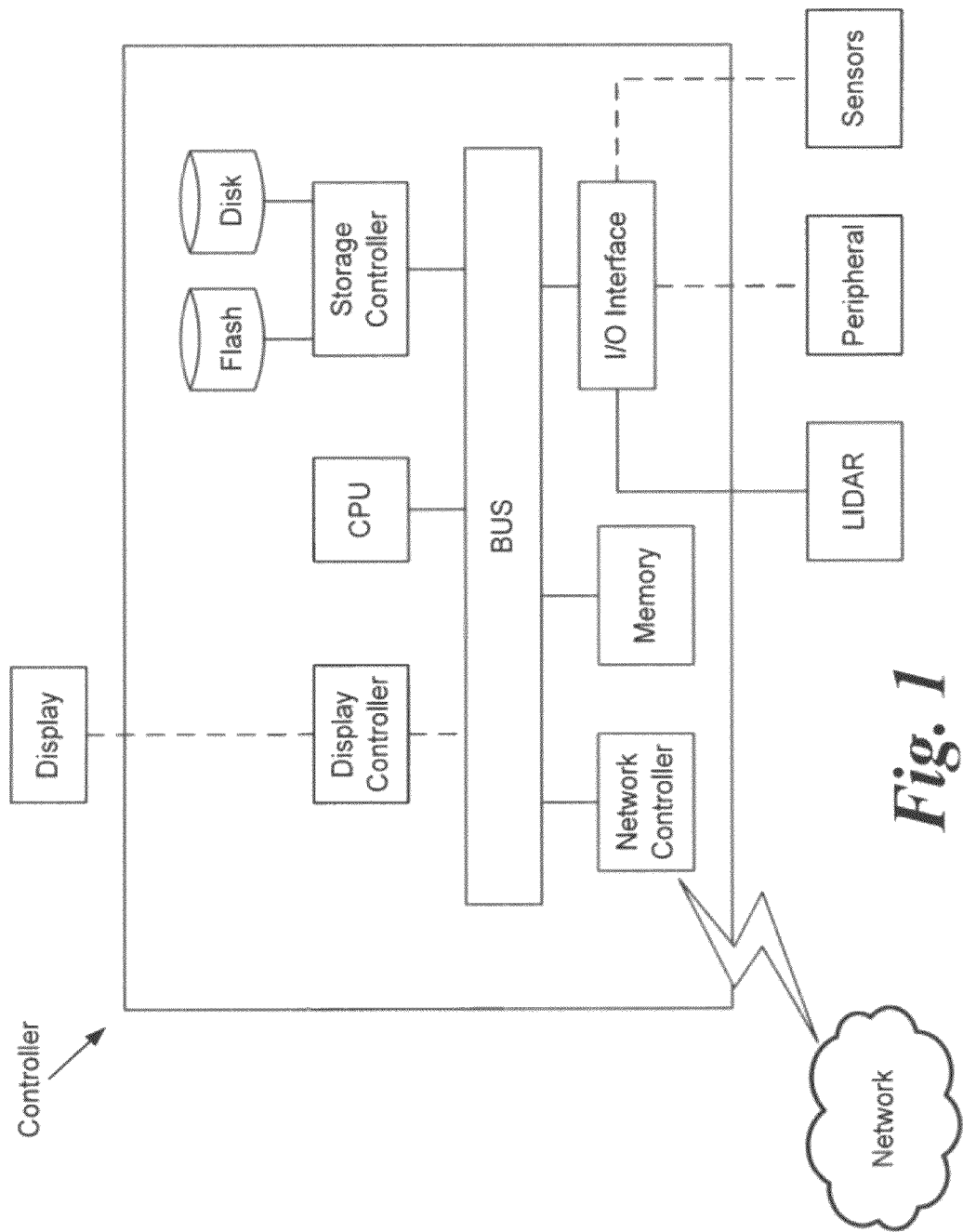
FIG. 1 is a block diagram of a controller according to one embodiment.

Referring now to the drawings, wherein like reference numerals designate identical or corresponding parts/steps throughout the several views, FIG. 1 is a block diagram of a controller according to one embodiment. The controller includes a processor or its equivalent, such as a central processing unit (CPU). The CPU may include or be embodied as one or more application specific processors.

The CPU utilizes a computer readable storage medium, such as a memory (e.g., ROM, EPROM, EEPROM, flash memory, static memory, DRAM, SDRAM, disk-based storage devices and their equivalents), and is configured to execute program code stored on the storage media to perform the methods, processes and algorithms described in this disclosure. The disk-based storage mediums can be controlled via a controller, such as a storage controller, which is configured to control a hard disk drive or an optical disk drive.

The CPU, in an alternate embodiment, may include or exclusively include a logic device for augmenting or fully implementing the methods, processes and algorithms described in this disclosure. Such a logic device includes, but is not limited to, an application-specific integrated circuit (ASIC), a field programmable gate array (FPGA), a generic-array of logic (GAL), and their equivalents. The CPU can be a separate device or a single processing mechanism. The CPU may also be a multi-core processor, such as an Intel Core® or Xeon based processor manufactured by Intel Corporation, including x86 instruction set capabilities. Accordingly, this disclosure may benefit from the parallel processing capabilities of a multi-cored CPU.

In another embodiment, processing in accordance with this application is performed at least in part by a display controller, which may include at least one graphic processing unit, for improved computational efficiency. The display controller may be connected to a display to display the various processes and algorithms of this disclosure, and an input/output interface is provided for connecting a peripheral, such as a keyboard and/or a pointing device for controlling parameters of the various processes and algorithms of this disclosure.

Further, the above noted components may be coupled to a network, such as the Internet or an Ethernet-based local area network, via a network controller for the transmission or reception of data, including 3D data from a 3D scanning device. Optionally, a 3D scanning device, such as a LIDAR device may be coupled directly to the controller through the input/output interface, where the storage controller and the memory operate to record and store 3D data points therefrom. A central BUS connects the above-noted components together and provides at least one path for digital communication.

An exemplary LIDAR device coupled to the controller shown in FIG. 1 is a Velodyne HDL-64E, manufactured by Velodyne Lidar, Inc. of Morgan Hill, Calif. The Velodyne HDL-64E includes 64 lasers/detectors and has a 360 degree field of view. This device also has a 50 meter range for pavement (~0.10 reflectivity) and a 120 meter range for cars and foliage (~0.80 reflectivity), and can collect more than 1.333 M points per second. Data from the Velodyne HDL-64E is output in 100 MBPS UDP Ethernet packets.

Accordingly, embodiments of this disclosure include the LIDAR device connected to the controller shown in FIG. 1 by way of the network controller. However, it should be readily appreciated this disclosure is not limited to the Velodyne HDL-64E, as this device is merely an exemplary component providing a source of 3D data points forming a point cloud.

The 3D data points form point cloud data which is then labeled. Several approaches for estimating the maximum likelihood labeling for a 3D point cloud involve a class of Markov Random Field problems. Such labeling problems may be reduced to the Ising model, which incorporates both local evidence and neighborhood label contiguity. Work by Anguelov et al. in "Discriminative Learning of Markov Random Fields for Segmentation of 3D Scan Data," CVPR '05: Proceedings of the 2005 IEEE Computer Society Conference on Computer Vision and Pattern Recognition (CVPR '05), Vol. 2, pp. 169-176, Washington, D.C., USA, 2005, IEEE Computer Society, and Munoz et al. in "Contextual Classification with Functional Max-margin Markov Networks," IEEE Computer Society Conference on Computer Vision and Pattern Recognition (CVPR), June 2009, demonstrates how random field approaches can be used to achieve high accuracy of classification using a maximum-margin training procedure.

However, margin-based approaches still require labeled training data, which is challenging to obtain in many autonomous driving scenes. According to aspects of this disclosure, the task of labeling each 3D point is reduced to a problem of estimating a ground surface height for some region around the vehicle, using the assumption that obstacle points can be trivially classified once the terrain is known.

The problem of terrain estimation was first addressed in the GIS community for processing aerial LIDAR data (see, e.g., Sithole and Vosselman in "Experimental Comparison of Filter Algorithms for Bare-Earth Extraction from Airborne Laser Scanning Point Clouds," ISPRS Journal of Photogrammetry and Remote Sensing, 59(1-2):85-101, 2004, Advanced Techniques for Analysis of Geo-spatial Data, which describes a large-scale terrain estimation approach). These approaches apply local geometric filters (e.g., incline thresholding) to classify aerial LIDAR points as terrain or objects.

Lu et al. in "A hybrid conditional random field for estimating the underlying ground surface from airborne lidar data," IEEE Transactions on Geoscience and Remote Sensing, 47(8):2913-2922, 2009, labeled aerial LIDAR data using a conditional random field which explicitly maintained variables for terrain height. LIDAR points were labeled as terrain or obstacles based on an expectation maximization algorithm which incorporated local geometric features in addition to terrain smoothness.

In an earlier approach, Wellington et al. in "A Generative Model of Terrain for Autonomous Navigation in Vegetation," The International Journal of Robotics Research, 25(12):1287-1304, 2006, employed a random field which simultaneously estimated variables for terrain height and terrain type over a discrete grid. Local observations were made in a 3D voxel representation which allowed the algorithm to incorporate historical observations. The random field was solved using a Gibb's sampling approach which estimated the likelihood of each column based on a Hidden Semi-Markov model learned from labeled training data.

In the approaches of both Lu et al. and Wellington et al., points were independent of their neighbors, and conditioned on their explicit variables for local terrain height and class. This conditional independence leads to a natural 2-stage algorithm in which points are classified in one stage, and the terrain is estimated in the second stage, proceeding until convergence.

Similarly, Hadsell et al. in "Accurate rough terrain estimation with space-carving kernels," Proceedings of Robotics: Science and Systems, Seattle, USA, June 2009, estimate terrain using a kernel-based function approximation technique, assuming that ground discrimination is handled separately.

Aspects of this disclosure adopt a multistage approach to point classification and terrain modeling. In the first step, weak classifiers are constructed by hand that offer better results than chance. Labeling from the weak classifiers is accumulated over time in a 3D grid. The set of vertical grid columns is then used as the input for a conditional random field model which provides a maximum-likelihood terrain estimate for some fixed area around the vehicle. The original point cloud data is then reclassified, using a height above terrain as a primary feature. New classifiers are trained from this relabeled data set in an automated fashion. This process is iterated until the terrain likelihood estimates converge.

Feature Generation

Feature generation for real-time point cloud classification has unique challenges from offline algorithms. First, while offline point cloud processing may use points generated from multiple timesteps, online algorithms must use features computed from instantaneously available data. Second, global coordinates of the point cloud will have some degree of uncertainty arising from the uncertainty in the ego-motion of the sensor platform. Consequently, features should be generated from a local coordinate system. Third, constructing a rapid full-cycle obstacle detection system requires calculating feature vectors very quickly. Certain features which may seem useful (e.g., collecting statistics on all neighboring points within a bounded region) may not be feasible to compute on a mobile platform with a short horizon to decision making.

Features, according to one aspect of this disclosure, are computed from the local geometry of a LIDAR scan, i.e., before any adjustments are made for ego-motion estimation. As noted above, the exemplary Velodyne LIDAR includes 64 lasers, each with a unique horizontal and vertical angular offset. Features are rapidly computed using data from neighboring beams computed from the internal geometry of the sensor. Table I contains a list of features for each laser point.

TABLE I

Local Features for Point Classification

| Feature | Description |
| --- | --- |
| $f_r$ | Beam range |
| $f_{L1}$ | Left beam range - $f_r$ |
| $f_{L2}$ | Right beam range - $f_r$ |
| $f_{L3}$ | Top beam range - $f_r$ |
| $f_{L4}$ | Bottom beam range - $f_r$ |
| $f_i$ | Beam remission |
| $f_z$ | z difference to sensor |
| $f_\delta$ | z difference to lowest measurement in grid cell |

Weak Classifiers

It is challenging to construct classifiers for the features listed in Table I without large amounts of labeled training data. In order to bootstrap the classification process, 2 weak classifiers are implemented as decision tree stumps. The first weak classifier uses the decision rule $f_\delta > \epsilon_1$. Specifically, for a given point within a discrete 2D grid cell, it is labeled as an obstacle if the z-component of that point is higher than the lowest z-component measured in the same grid cell (experimentally, according to the examples described herein $\epsilon_1 = 1.0$). This classifier is useful for labeling obstacle points on walls, trees, and the tops of vehicles.

The second weak classifier labels points as obstacles if $f_{L4} > \epsilon_2$. Experimentally, $\epsilon_2$ was set to −0.05 meters to reflect the confidence in LIDAR return range. This parameter relates to the local inclination around the point, where steeper inclines will yield relatively larger values for $f_{L4}$.

The labeled output of the weak classifiers is used as the observable data of a terrain estimation procedure. Since terrain does not vary over time, statistics are used on all of the data produced by the weak classifiers from multiple LIDAR returns. A 3D grid is maintained which keeps track of certain statistics such as the number of weakly-classified obstacle hits in each voxel. Table II shows the features used for each column.

TABLE II

Features Computed for Discrete Column I using Weak Classifier Output

| Feature | Description |
| --- | --- |
| $\mu_g^i$ | Average height of ground hits in global coordinates |
| $\sigma_g^i$ | Variance of ground hit heights |
| $\mu_o^i$ | Average height of obstacle hit in global coordinates |
| $\sigma_o^i$ | Variance of obstacle hit heights |
| $\mu^i$ | Ground height as measured by known tire position |
| $\sigma_t^i$ | Variance of tire hit heights |
| $z^i$ | CRF height label for column i |

FIGS. 2A-2B show an example, by two dimensional graphs, of weak classification results. Features such as comparative beam length tend to classify steep obstacles well, but misclassify planar portions of obstacles. In FIGS. 2A-2B, a LIDAR 200 is collecting point cloud data around obstacle 202. Points 204 are identified as obstacle points, whereas points 206 are identified as terrain points. Point 208 is misclassified in FIG. 2A as a terrain point. However, in FIG. 2B, a terrain surface 210 is estimated which fits terrain points 206 and respects smoothness constraints, allowing the reclassification of the misclassified point 208.

CRF Formulation

Figure 3A:
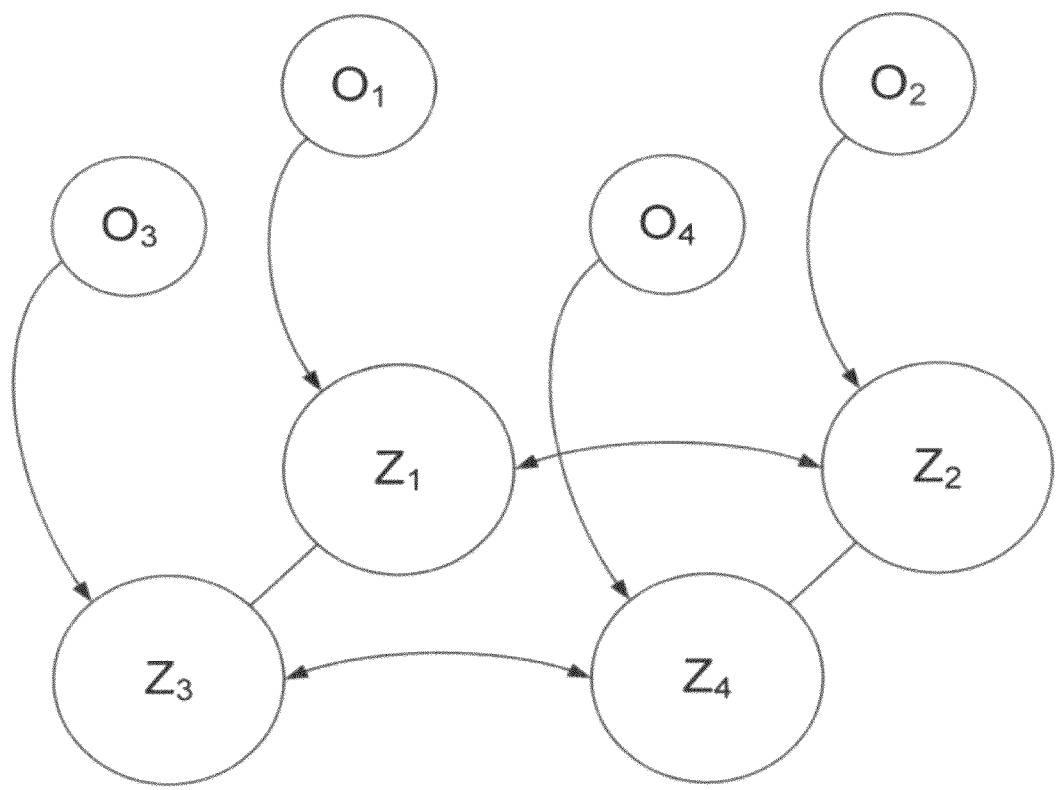
FIG. 3A is a graphical illustration of a CRF model capturing independence of observations for terrain heights.
Figure 3B:
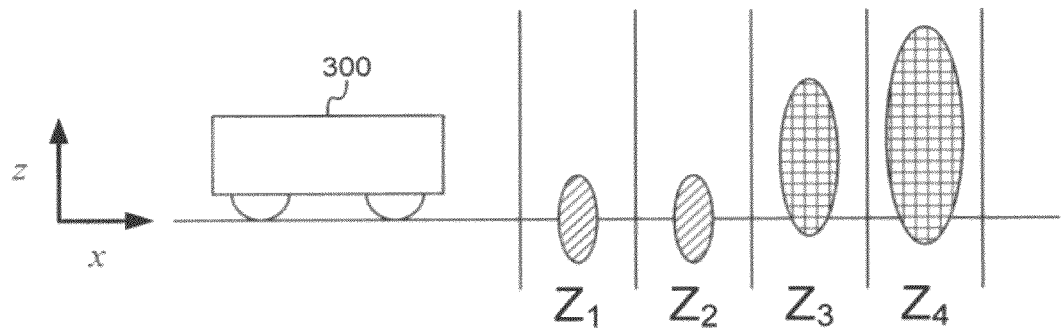
FIG. 3B is another graphical illustration of the CRF model shown in FIG. 3A showing each terrain height estimate for a vehicle depending only on local observations and neighborhood labels.

A Conditional Random Field (CRF) in Gibbsian form is used to find the most likely continuous labeling for the vector of terrain heights Z. FIGS. 3A-3B show a graphical model for such a system. FIG. 3A is a graphical illustration of a CRF model capturing independence of observations $O_1$-$O_4$ for terrain heights $Z_1$-$Z_4$ for respective columns 1-4. Thus, terrain heights $Z_i$ depend on neighboring terrain heights and summary statistics $O_i$ of a column i. FIG. 3B is another graphical illustration of the CRF model, in which each grid cell height estimate $Z_1$-$Z_4$ for a vehicle 300 depends only on local observations and neighborhood labels.

The conditional likelihood of a terrain estimate Z is:

$$P(Z \mid O) = \frac{1}{Q} \exp(-(\omega_\psi \Psi(Z, O) + \omega_\phi \Phi(Z))) \quad (1)$$

where $\psi$ and $\phi$ represent the local and neighborhood potentials, and Q is the partition function. See Winkler, "Image Analysis, Random Fields, and Markov Chain Monte Carlo Methods," Springer, 2003.

The potential functions for local evidence and neighborhood effects are based on a continuous extension of the familiar Ising model. The first and second terms ($\Psi_1$ and $\Psi_2$) of the local evidence function $\Psi$ drive the terrain towards the wheel estimates and the local estimates for ground point distribution, respectively. The third term $\Psi_3$ creates a potential which drives the terrain below increasing densities of obstacle hits, in proportion to the cumulative density function of the best-fit Gaussian.

$$\Psi(Z, O) = \sum_j \Psi_j(Z, O) \quad (2)$$

$$\Psi_1(Z, O) = \frac{1}{2\sigma_t^2}(z^i - \mu_t^i)^2 \quad (3)$$

$$\Psi_2(Z, O) = \frac{1}{2\sigma_t^2}(z^i - \mu_g^i)^2 \quad (4)$$

$$\Psi_3(Z, O) = -\ln\left(1 - \frac{1}{2}\left[1 + \operatorname{erf}\frac{(z^i - \mu_o^i)}{\sigma_o^i \sqrt{2}}\right]\right) \quad (5)$$

The neighborhood function encodes the assumption that ground height varies smoothly with neighboring cells.

$$\Phi(Z) = \frac{1}{2} \sum_i \sum_{j \in N(i)} (z_i - z_j)^2 \quad \text{[Neighborhood Continuity]} \quad (6)$$

Optimization

As is commonly stated, solving this problem optimally is generally intractable. Thus, a high likelihood approximation of the posterior is settled for as in Diebel et al., "An Application of Markov Random Fields to Range Sensing," Proceedings of Conference on Neural Information Processing Systems (NIPS), Cambridge, Mass., The MIT Press, 2005:

$$Z_m^* = \arg\max_Z(\log P(Z \mid O)) \quad (7)$$

which is equivalent to finding a local minima of the energy $U(Z, O) = \omega_\psi \Psi(Z, O) + \omega_\phi \Phi(Z)$. This minimization can be efficiently implemented using conjugate gradient optimization:

$$\frac{\partial \Psi}{\partial z^i} = \frac{(z^i - \mu_t^i)}{2\sigma_t^2} + \frac{(z^i - \mu_g^i)}{2\sigma_g^2} - \frac{\frac{1}{\sqrt{2\pi \sigma_o^i}} \exp\frac{-1}{2}\left(\frac{z^i - \mu_o^i}{\sigma_o^i}\right)^2}{1 - \frac{1}{2}\left[1 + \operatorname{erf}\frac{(z^i - \mu_o^i)}{\sigma_o^i \sqrt{2}}\right]} \quad (8)$$

and $$\frac{\partial \Psi}{\partial z^i} = \sum_{j \in N(i)} (z^i - z^j) \quad (9)$$

Experiments and Results

Approximately 30 minutes of normal driving data in parking lots and urban streets was collected in the results discussed in this section. Each frame of LIDAR data was processed using the hand-constructed weak classifiers. The 3D voxelized representation of the world was built to maintain distributions over weak feature classifications. The CRF above was optimized using a sliding window approach with a 100×100 grid at 1 meter resolution.

Subsequently, the LIDAR points from each frame were relabeled using height above terrain model as the primary classifier. Local geometric features were computed for every laser point using the features listed in Table I. Training of strong classifiers was accomplished using standard Decision Tree implementations found in OpenCV (See Bradski et al., "Learning OpenCV: computer Vision with the OpenCV Library," O'Reilly, 2008). The speed of the decision tree implementation was increased by compiling the trees to machine code.

Figure 7B:
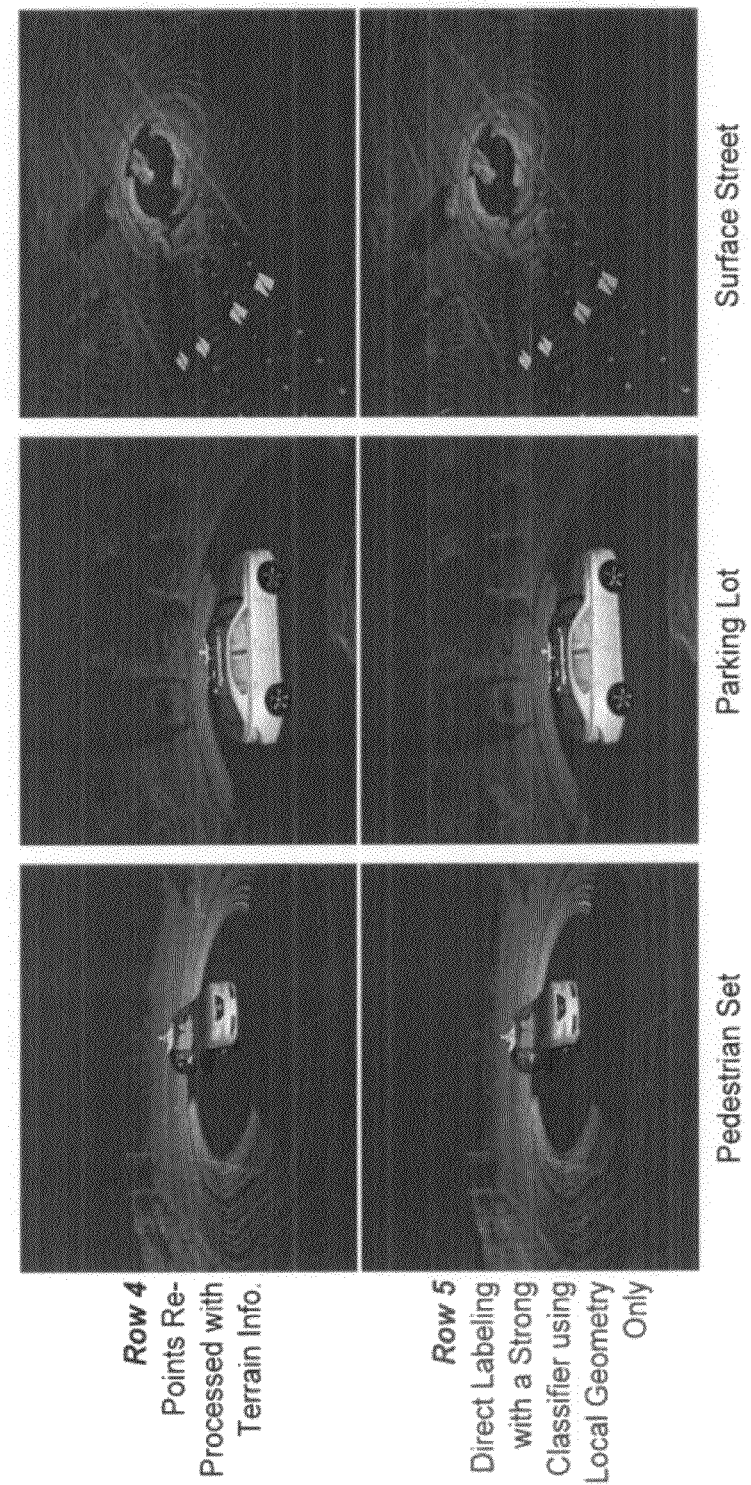

FIGS. 7A-7B contain results of the experiments. In each data set discussed below, the weak classifiers are capable of recognizing many points on an obstacle, but also misclassify a large number of points. Typically, these misclassified points would not be used for individual object classification, and the missing points might also prevent good estimates for tracking. However, incorporation of the terrain prior for smoothness allows many of these points to be correctly and efficiently relabeled as is seen in row 4 of FIG. 7B. The final strong classifier does an equivalently good job at discriminating obstacle points, yet does so without needing to estimate the local terrain.

Figure 4:
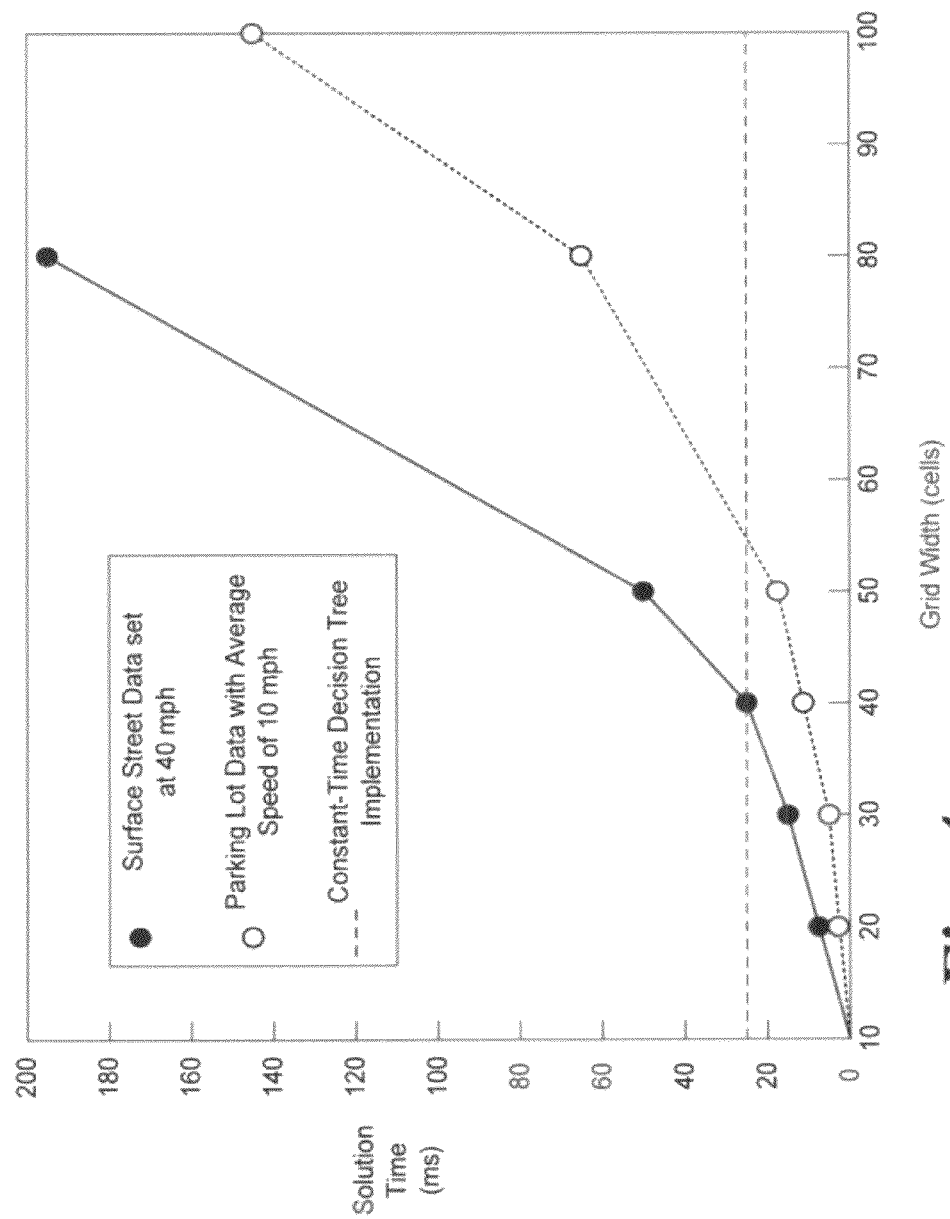
FIG. 4 is a graph of terrain estimation CPU time as a function of a number of state variables for grid sizes 10×10 through 100×100.

The final decision tree implementation requires less than 30 ms to classify more than 100,000 points, which includes feature vector construction. By contrast, FIG. 4 shows the amount of time required to estimate the terrain model for an area around the vehicle. FIG. 4 shows terrain estimation CPU time as a function of number of state variables for grid sizes 10×10 through 100×100. The dashed line is taken from a Parking Lot data set with an average speed of 10 mph. The solid line is taken from a Surface Street data set at 40 mph. Differences in solution rate are the result of greater re-use of previous solutions for the slower dataset. The slower dataset achieves higher solution rate through more frequent re-use of previous solutions. The horizontal dashed line represents a constant-time decision tree implementation.

To decrease the computational cost of the conjugate gradient optimization, the solution is seeded with the previous best terrain estimate. However, at higher velocities, the vehicle is less able to reuse existing solutions, and optimization time increases.

Evaluating the quality of the final classification is generally difficult without human-labeled data. However, the quality of the decision trees and the quality of the terrain estimation may be evaluated separately. Table III shows good correlation between the CRF output and the rules learned by the decision tree, where '+' represents obstacle class. In some cases, the decision tree may generalize better than the CRF output. FIG. 2, as discussed above, shows possible errors which can occur during the terrain estimation process when the weak classifiers mislabel the data. FIGS. 7A-7B actually contain this type of error: points measured from a car on a side street are still considered to be ground due to numerous weak classifier mistakes. However, the final rules learned from the decision tree generalize well enough from other pieces of training data to detect the obstacle.

TABLE III

Trained Decision Tree Agreement with Terrain Estimate Data

| | Terrain+ | Terrain− |
|---|---|---|
| Tree+ | 17.9 | 1.3 |
| Tree− | 1.5 | 79.2 |

Figure 5:
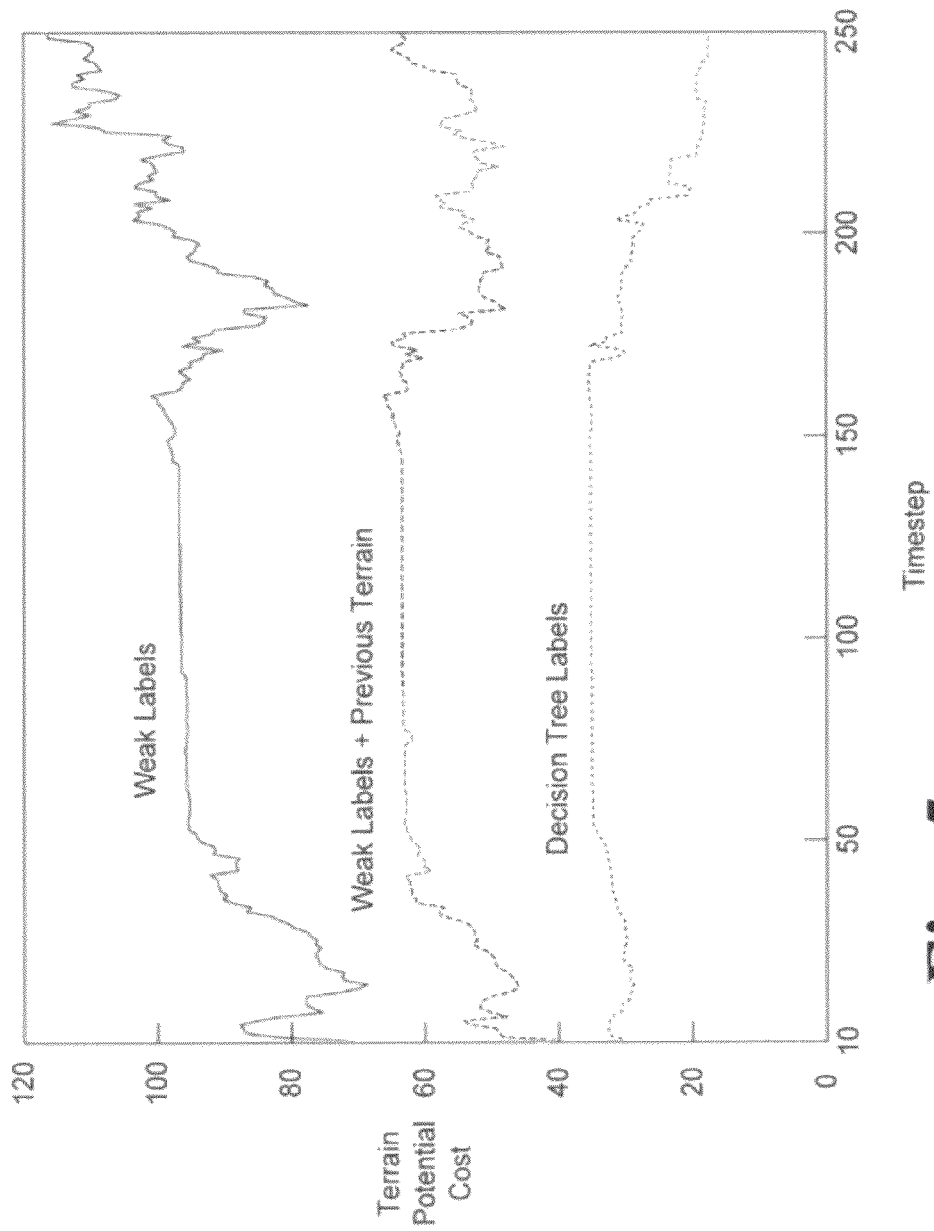
FIG. 5 is a graph of minimum terrain cost as a function of timesteps during a Parking Lot test.

The potential cost of the optimal solution to Equation 7 is used to evaluate each point labeling strategy in FIG. 5. FIG. 5 shows a minimum terrain cost as a function of timesteps during the above-discussed Parking Lot test. Terrain was optimized using Weak Labels (top), Weak Labels+Previous Terrain (middle), and Decision Tree Labels (bottom). The most costly terrain estimate arises from the weak classifiers, while the best terrain estimate is found by relabeling points with terrain data as it becomes available. The terrain estimates using labels from the decision tree validates the assumption that the decision tree approximates the maximum likelihood terrain estimate more closely than weak classifiers.

The above-discussed aspects of this disclosure presents a machine-learning approach to train discriminative classifiers without any human labeled data. Including neighborhood priors in a point labeling procedure allows weak classifiers to be bootstrap into a competent binary segmentation algorithm. This bootstrapping has been demonstrated as able to generate a large amount of labeled training data. The success of the final classifier shows that there is sufficient information within the local geometric features to discriminate obstacles. In addition, by preventing over fitting of strong classifier models, classifiers are able to be learned which out-perform an initial labeled data set.

In the above-discussed aspects, the random field for estimating terrain was kept deliberately simple for ease of computation. Since the bootstrapping process can be performed offline, more computationally challenging models can be implemented as described in Lu et al., noted above, which discusses iteratively converging on good labels for all the points within the scene.

The total computation time from LIDAR point acquisition to labeling is less than 50 ms, which means this algorithm is capable of operating in real-time on a vehicle with sensor information arriving at 10 Hz. The rapid discrimination of obstacle points allows the vehicle to spend more CPU time on object segmentation, classification, and tracking. In particular, more robust point discrimination results in higher efficacy for segmentation and classification algorithms.

FIG. 6 represents the result of obstacle discrimination according to this disclosure applied to a straight-forward distance-based segmentation algorithm. In FIG. 6, obstacle points are segmented within a scene. Here, each outline and different shading represents different segmentation groups. Thus, vehicle 600 segments regions 602 and 604, for example, as different segmentation groups. The scene shown in FIG. 6 represents a parking lot, with cars positioned in each of regions 602 and 604 and the other shaded regions.

Without removal of non-obstacle points, a simple segmentation algorithm would not provide correct groupings for obstacle points. The training process described herein demonstrates the best for efficient and accurate obstacle discrimination.

Further implementations of aspects of this disclosure extend this binary discrimination to automatically train classifiers for dynamic objects within the scene, such as vehicles and pedestrians.

As discussed above, FIGS. 7A-7B illustrate results of the above-described embodiments. FIGS. 7A-7B are pictures illustrating comparative classification results from three test sets: Pedestrian Set, Parking Lot, and Surface Street. The first row shows the original data colored by height. The second row shows the output of the weak classifier. The third row shows the optimal terrain conditioned on the weak classifier. The fourth row shows points reprocessed with terrain information. The final and fifth row is directly labeled with a strong classifier using only local geometry.

Figure 8:
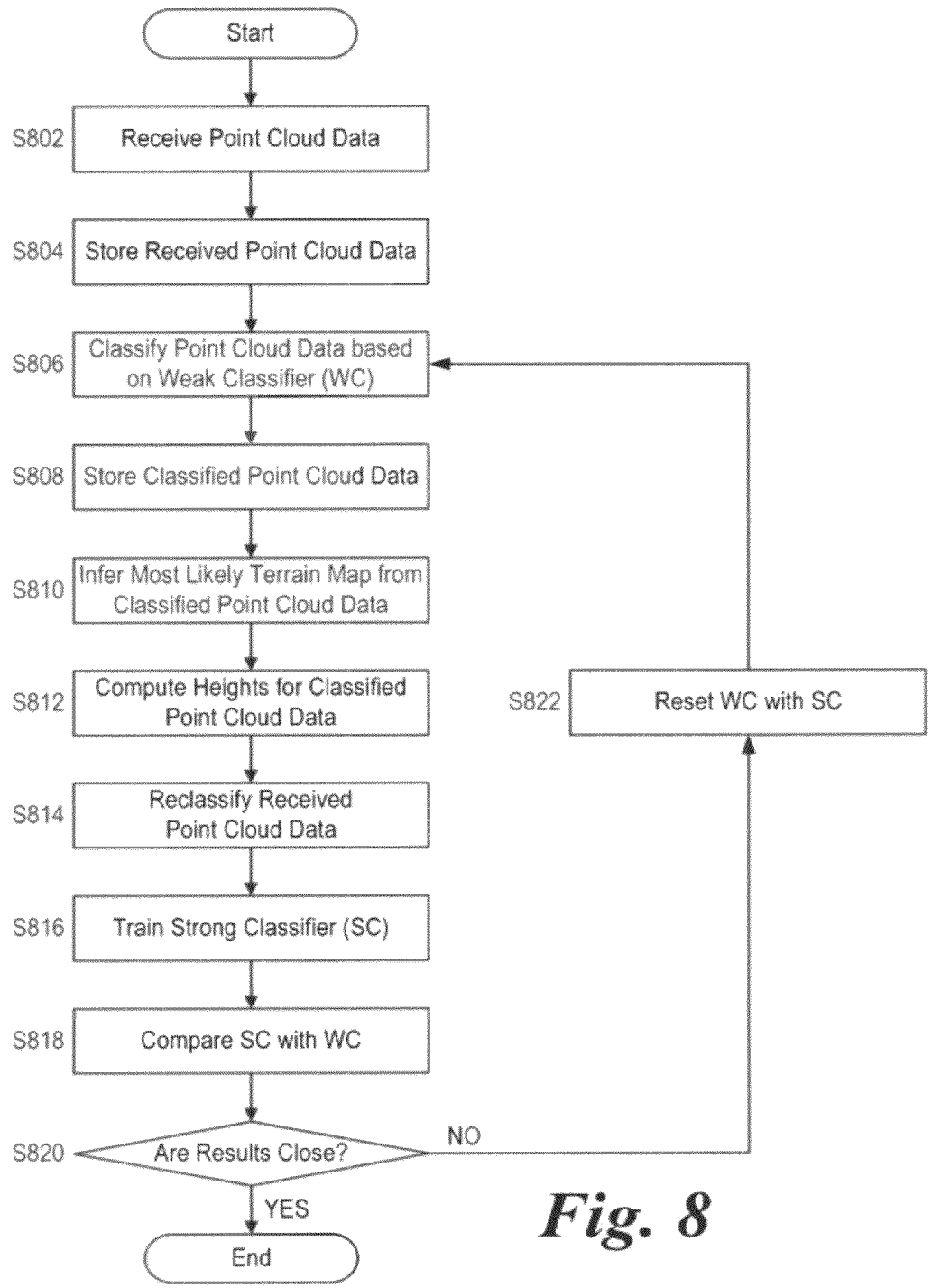
FIG. 8 is a flowchart showing an algorithmic process of training a Strong Classifier according to one embodiment.

An algorithmic process in accordance with one embodiment of this disclosure is shown by the flowchart of FIG. 8. Here, at S802, point cloud data is received. As discussed above, the point cloud data may be data from a 3D LIDAR device. At S804, the received point cloud data is stored in a memory, and at S806, the received point cloud data is classified (labeled) as an obstacle or a non-obstacle based on a Weak Classifier (WC). The WC may be initially constructed manually. In one embodiment, the classified point cloud data is maintained in a 3D grid centered around the vehicle or the 3D LIDAR device, and statistics over label type are maintained in the 3D grid. At S808, the classified point cloud data is stored.

A most likely terrain map is inferred from the classified point cloud data at S810. For example, referring to FIGS. 2A-2B, a terrain surface may be estimated which fits ground points and respects smoothness constraints. Then, heights for the classified point cloud data are computed at S812 using the most likely terrain map, which is a terrain estimation. In one embodiment, a terrain height is estimated for each column in the 3D grid based on local statistics previously accumulated in that column. The point cloud data stored at S804 is then re-classified at S814 as an obstacle or a non-obstacle based on the computed heights. A Strong Classifier (SC) is trained based on the re-classified point cloud data at S816, which is utilized as a new WC in iterations of S806.

At S818, the WC and the SC are compared. When results of the comparison are sufficiently close, at S820, the process ends and the SC is maintained for classification of point cloud data. However, when results are not close, at S820, the algorithm proceeds to S822, where the WC of S806 is reset to the SC trained at S816. Thereby, S806-S816 are re-executed based on the reset classifier (previously trained SC), and a comparison is performed at S818 between the prior SC (now referred to as a WC) and a newly trained SC. This process iteratively continues until results of the WC and the SC are sufficiently close.

Concerning the comparison performed at S818 and the determination performed at S820 of whether the results of the SC and WC are sufficiently close, each of these classifier acts to label the point cloud data, where a terrain map is inferred from the labeled (classified) point cloud data using a CRF model. The CRF model is a statistical model which attempts to make the terrain smooth and match labeled data, which may be contradictory goals of the model. The CRF model provides guidance for estimating the probability of a particular Terrain Map matching a given terrain.

For example, given a terrain map M, the CRF can determine a probability of M, p(M), which is a function of the labeled data and the smoothness priors. A conjugate gradient optimization algorithm is utilized to find the map M with the highest probability p(M) for the labeled data. If the labeled data is poorly labeled (e.g., random noise), then the p(M) is expected to be low. Similarly, if the labeled data is labeled well, then the CRF optimizer is expected to find a good map with a high p(M). Thus, the CRF optimization process provides a tool for determining whether labeled data is "better" or "worse" based on the associated maximum likelihood map.

Adverting back to FIG. 8, the WC of S806 can be denoted $C_0$, which produces $Labels_0$, which leads to a $Map_0$ having a probability $p(Map_0)$. The SC trained at S816 can be denoted $C_1$, which produces $Labels_1$, which leads to a $Map_1$ having a probability $p(Map_1)$. Later trained classifiers can be denoted $C_2$, $C_3$, and so on as necessary. At S818, if $p(Map_0) \approx p(Map_1)$, then the results are determined as close at S820, and the process ends. Otherwise, the process continues to S822, and $C_2$ is compared with $C_1$, then $C_3$ is compared with $C_2$, and so on as necessary.

In one embodiment, the results of a comparison (e.g., $p(Map_0)$ and $p(Map_1)$) can be determined as sufficiently close when a difference between resulting values is within a predetermined threshold or $p(Map_0)$ is a predefined fraction/percent of $p(Map_1)$. These thresholds may vary depending on a range of values of $p(Map_0)$ or $p(Map_1)$. However, it should be appreciated other methods of comparing the classifiers can be utilized without detracting from the scope of this application.

The invention claimed is:

1. A controller for training a classifier, the controller comprising a processor configured to:
   classify point cloud data with a first classifier;
   infer a first terrain map from the classified point cloud data;
   reclassify the point cloud data with the first classifier based on the first terrain map;
   train a second classifier based on the point cloud data reclassified with the first classifier based on the first terrain map;
   compare a first classification result of the first classifier with a second classification result of the second classifier;
   determine whether the first result is sufficiently close to the second result; and
   in response to determining the first and second results are not sufficiently close, classify the point cloud data with the second classifier and infer a second terrain map from the point cloud data classified by the second classifier.

2. The controller according to claim 1, the processor further configured to:
   reclassify the point could data with the second classifier based on the second terrain map.

3. The controller according to claim 2, the processor further configured to:
   train a third classifier based on the point cloud data reclassified with the second classifier based on the second terrain map.

4. The controller according to claim 3, the processor further configured to:
   compare the second classification result of the second classifier with a third classification result of the third classifier;
   determine whether the second result is sufficiently close to the third result; and
   in response to determining the second and third results are not sufficiently close, classify the point cloud data with the third classifier and infer a third terrain map from the point cloud data classified by the third classifier.

5. The controller according to claim 4, the processor further configured to:
   in response to determining the second and third results are sufficiently close, utilize the third classier to classify newly received point cloud data.

6. The controller according to claim 4, the processor further configured to:
  iteratively train classifiers until a classification result of an Nth classifier is sufficiently close to a classification result of an Nth−1 classifier; and
  utilize the Nth classier to classify newly received point cloud data.

7. The controller according to claim 1, the processor further configured to:
  in response to determining the first and second results are sufficiently close, utilize the second classier to classify newly received point cloud data.

8. The controller according to claim 1, the processor further configured to:
  infer the first and second terrain maps using a conditional random field (CRF) model.

9. The controller according to claim 8, the processor further configured to:
  determine first and second probabilities of the first and second terrain maps, respectively, matching a given terrain, wherein the processor compares the first and second results based on the first and second probabilities.

10. The controller according to claim 9, wherein the processor determines the first and second results are not sufficiently close when the first and second probabilities are not approximately equal.

11. The controller according to claim 9, wherein the processor determines the first and second results are not sufficiently close when the first and second probabilities are not within a predetermine range of each other.

12. The controller according to claim 8, wherein the CRF model is configured to smooth terrain and match labeled data.

13. The controller according to claim 1, the controller further comprising:
  a first network interface controller configured to establish a communication link between the processor and a sensor which acquires the point cloud data, the first network controller configured to receive the point cloud data from the sensor.

14. The controller according to claim 13, further comprising:
  the sensor, wherein the sensor includes a light detection and ranging (LIDAR) scanning device and a second network controller configured to communicate with the first network controller.

15. The controller according to claim 1, wherein the first and second classifiers are configured to classify data points of the point cloud data as an obstacle or a non-obstacle.

16. The controller according to claim 1, wherein the first classifier is manually constructed and the second classifier is constructed by training performed by the processor.

17. A vehicle including the controller defined in claim 1.

18. A method of training a classifier with a processor, the method comprising:
  classifying point cloud data with a first classifier;
  inferring a first terrain map from the classified point cloud data;
  reclassifying the point cloud data with the first classifier based on the first terrain map;
  training a second classifier based on the point cloud data reclassified with the first classifier based on the first terrain map;
  comparing a first classification result of the first classifier with a second classification result of the second classifier;
  determining whether the first result is sufficiently close to the second result; and
  in response to determining the first and second results are not sufficiently close, classifying the point cloud data with the second classifier and inferring a second terrain map from the point cloud data classified by the second classifier.

19. A non-transitory recording medium storing instructions that when executed by a processor cause the processor to perform a method of training a classifier, the method comprising:
  classifying point cloud data with a first classifier;
  inferring a first terrain map from the classified point cloud data;
  reclassifying the point cloud data with the first classifier based on the first terrain map;
  training a second classifier based on the point cloud data reclassified with the first classifier based on the first terrain map;
  comparing a first classification result of the first classifier with a second classification result of the second classifier;
  determining whether the first result is sufficiently close to the second result; and
  in response to determining the first and second results are not sufficiently close, classifying the point cloud data with the second classifier and inferring a second terrain map from the point cloud data classified by the second classifier.

* * * * *